US005548272A

United States Patent [19]

Clark

[11] Patent Number: 5,548,272

[45] Date of Patent: Aug. 20, 1996

[54] TALKING POSTER

[75] Inventor: Aaron D. Clark, Reynoldsburg, Ohio

[73] Assignee: Inotrend, Inc., Reynoldsburg, Ohio

[21] Appl. No.: 402,195

[22] Filed: Mar. 10, 1995

[51] Int. Cl.$^6$ .................................................... H04B 3/36

[52] U.S. Cl. .................................. 340/407.1; 340/286.11; 340/384.1; 340/384.7; 340/328; 40/455; 40/906

[58] Field of Search ............................ 340/407.1, 286.11, 340/328, 384.1, 384.7; 40/455, 457, 463, 906, 717, 124.1

[56] References Cited

U.S. PATENT DOCUMENTS

| | | | |
|---|---|---|---|
| 3,978,598 | 9/1976 | Rose et al. | 40/106.52 |
| 4,299,041 | 11/1981 | Wilson | 40/124.1 |
| 4,934,079 | 6/1990 | Hoshi | 40/427 |
| 5,051,728 | 9/1991 | Wang | 340/573 |
| 5,309,519 | 3/1994 | Park et al. | 381/190 |
| 5,359,374 | 10/1994 | Schwartz | 354/76 |
| 5,480,156 | 1/1996 | Doederlein et al. | 273/237 |

*Primary Examiner*—Brent A. Swarthout
*Assistant Examiner*—Julie B. Lieu
*Attorney, Agent, or Firm*—Standley & Gilcrest

[57] ABSTRACT

A talking poster is disclosed. The present invention is a novel method and apparatus for providing a material piece for housing the sound components, that incorporates the poster artwork. The material piece is painted with a portion of the artwork from the poster and lithographed in solid white on the reverse of the material piece. The material piece is then vacuum formed to the desired shape and adhered to the poster at the proper location with the hardware concealed within it.

5 Claims, 2 Drawing Sheets

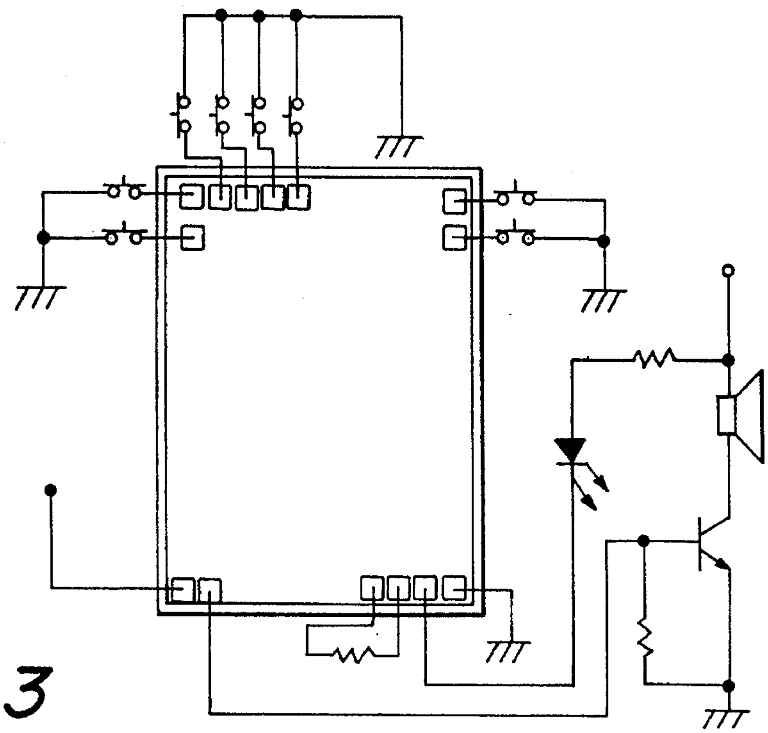
Fig. 3
Fig. 4
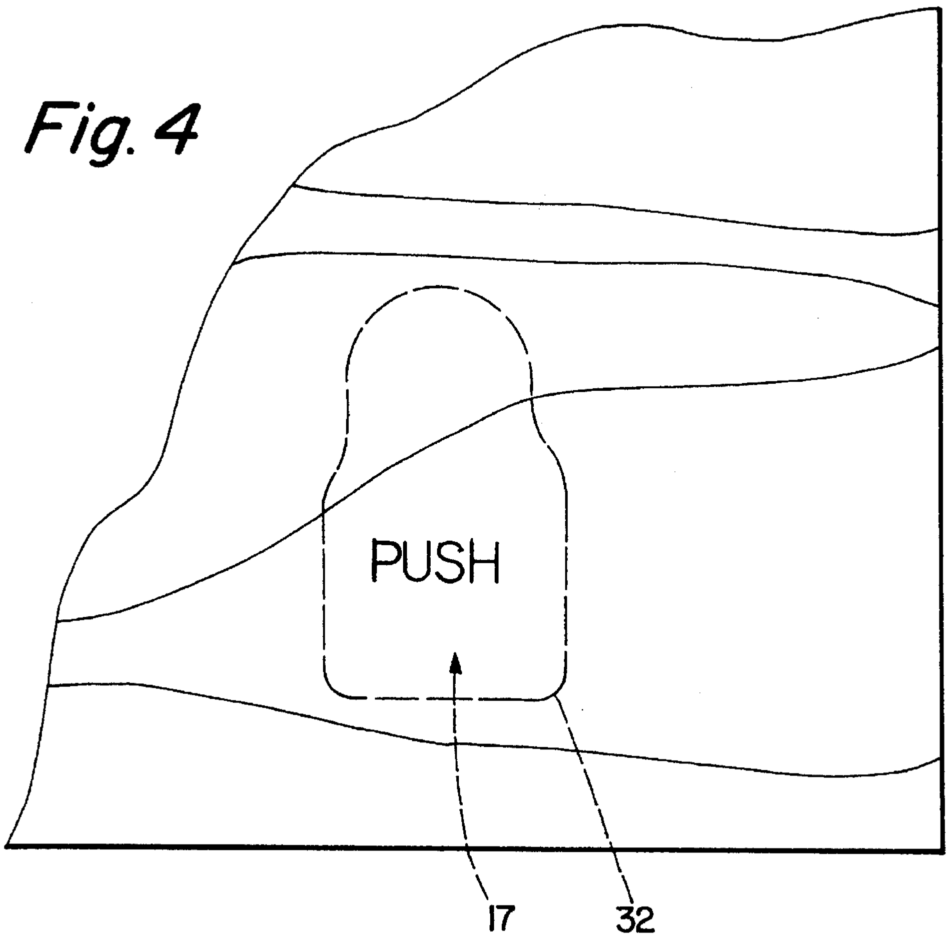

TALKING POSTER

BACKGROUND AND SUMMARY OF THE INVENTION

The present invention relates generally to the art of posters and more particularly to a talking poster that projects a recorded sound using a device that is attached to the poster with material that is painted to match the color scheme of the poster art.

Poster sales are primarily dependent upon the novelty and attraction of individual posters. Posters must not only contain subject matter that is appealing but must also be of high quality to be attractive to consumers.

The present invention offers novel features to enable talking posters. The present invention is a novel method and apparatus for providing sound techniques under a material that incorporates the poster artwork into the material. A preferred material is blister pack. The blister pack material is painted with a portion of the artwork from the poster and lithographed in solid white on the blister pack material. The material is then vacuum formed to the desired shape and adhered to the poster at the proper art location, with the sound hardware concealed within it.

The use of the present invention allows the material covering the sound hardware to be placed anywhere on the surface of the poster artwork. The present invention also allows conventional posters to be adapted for sound, where it was previously considered impossible.

Other principal features and advantages of the invention will become apparent to those skilled in the art upon review of the following detailed description, claims and drawings.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 is a schematic view of an application circuit for one preferred embodiment of a speech chip of the present invention; and FIG. 4 is a cutaway view of a talking poster of the present invention.

DESCRIPTION OF THE PREFERRED EMBODIMENT(S)

Figure 1:
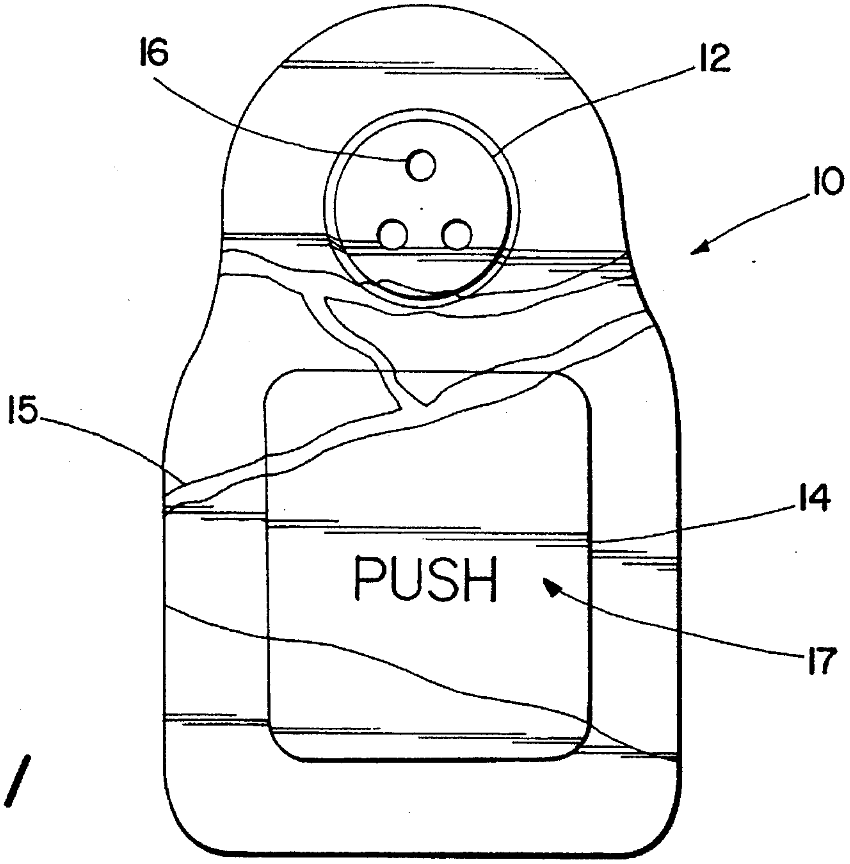
FIG. 1 is a plan view of a material piece of the present invention for covering sound hardware on a poster.

The present invention is designed to provide a poster with a prerecorded message that may be played back on command. The invention uniquely provides the poster with the sound equipment without interfering with the artwork on the poster. FIG. 1 shows a plan view of a material piece 10 of the present invention. Material piece 10 is shown in its vacuum formed shape with raised surfaces at 12 and 14. Raised surface 12 may be used to contain and conceal a speaker and may allow the sound to emanate through holes 16. Raised surface 14 may be used to contain and conceal a circuit board. The uneven and broken lines 15 shown on the face of material piece 10 exemplify portions of poster artwork. An indication 17 may be used to indicate where one may trigger the sound mechanism of the present invention.

Figure 2:
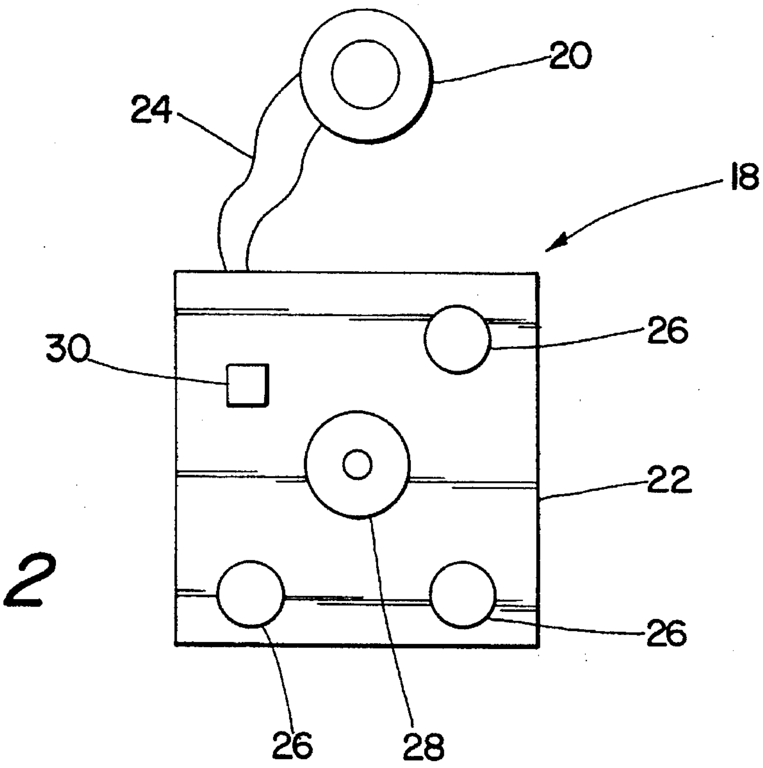
FIG. 2 is a plan view of one preferred embodiment of an electrical circuit of the present invention.

FIG. 2 is a plan view of an electric circuit 18 of the present invention. Circuit 18 may include a speaker 20 attached to a circuit board 22 with wires 24. One or more batteries 26 may be used to power the circuit and a push button switch 28 may be used to trigger the sounds. Speech chip 30 may be used to control the circuit with the necessary logic.

FIG. 3 is a schematic of an embodiment of the present invention that utilizes a speech chip. The speech chip may be a Holtek model HT-81400 or a comparable model.

FIG. 4 is a cutaway view of the present invention as applied to a poster. An outline of the material piece is shown in dashed lines at 32 to indicate that the material piece may not be visible on the poster except on close inspection. Indication 17 may be visible to indicate how one may trigger the playback of the recorded sounds.

The following is one example method for constructing a preferred embodiment of the invention. The material piece, comprised of blister pack material, preferably comprises 0.010" thick clear PVC sheet. This sheet of material may be lithographed using a multi-color process printing technology to match the poster artwork. When finished, the material piece will artistically fit onto the poster, without any disruption in the poster artwork. In other words, the material piece will have the exact coloring and artwork on it, as would the space on the poster board where the piece resides, if the material piece was not present. The sheet is preferrably printed on its second surface in reverse. This means that when the sheet is viewed from the front the ink will be on the back side of the sheet. The outer blister pack material also protects the paint from scratches, marring, etc. during use. After the poster artwork is applied a coat of white ink may be applied to enhance the printing and to keep the artwork ink from sticking to the molds, which may be made of a high temperature aluminum filled epoxy.

The blister pack material may then be vacuum-formed to achieve the desired final configuration. Preferrably, the forming is accomplished by clamping the sheet in a frame and heating it with a radiant heat oven to approximately 240 degrees Fahrenheit. After reaching the desired forming temperature, the sheet is pliable and may be pulled down over the molds. A vacuum may be applied to assist the material in conforming to the shape of the mold. Cooling fans may be used to cool the sheet while on the molds until the material is rigid enough to remove from the molds.

While the sheet is still in the mold, a piece of double-sided adhesive material may be adhered to the back side of the sheet. The sheet may then be placed in a steel rule die and cut to conform to the desired shape of the product.

The scope of the invention is not to be considered limited by the above disclosure, and modifications are possible without departing from the spirit of the invention as evidenced by the following claims.

What is claimed is:

1. An assembly, comprising:

a poster comprised of a first material, said poster having a first surface, said first surface including poster art thereon;

a housing comprised of a second material, said housing attached to a portion of said first surface of said poster;

a speaker concealed between said housing and said first surface of said poster;

an electric circuit including a sound production component, operatively connected to said speaker and concealed between said housing and said first surface of said poster;

a trigger attached to said electric circuit and concealed within said housing, said trigger adapted to be actuated through said housing to produce said sound;

wherein a surface of said housing is prepared with a matching art which is substantially the same as that arca of said poster art which appears on said portion of said poster that said housing covers when said housing is attached to said poster, such that said housing artistically blends in with the surrounding poster art that is not covered by said housing.

2. The talking poster of claim 1, wherein said electric circuit comprises:

a circuit board;

at least one battery attached to said circuit board; and a speech chip.

3. The assembly of claim 1, wherein said second material is a blister pack material.

4. The assembly of claim 3, wherein said matching art on said blister pack is printed on the surface of said blister pack that faces said poster when said assembly is assembled.

5. A method for making a talking poster, comprising the steps of:

providing a poster with poster art on a first surface thereof;

providing human actuatable sound components adapted to be contained on said poster;

providing a housing adapted to be secured onto a portion of said first surface of said poster;

applying matching art to said housing which is substantially the same as that area of said poster art which appears on said portion of said poster that said housing covers when said housing is attached to said poster, such that said housing artistically blends in with the surrounding poster art that is not covered by said housing; and securing said housing onto said portion of said first surface of said poster, such that said housing conceals said sound components.

* * * * *

UNITED STATES PATENT AND TRADEMARK OFFICE

CERTIFICATE OF CORRECTION

PATENT NO. :5,548,272

DATED : August 20, 1996

INVENTOR(S) :Aaron D. Clark

It is certified that error appears in the above-identified patent and that said Letters Patent is hereby corrected as shown below:

In column 3, line 8, please delete the word "arca" and replace it with --area--.

Signed and Sealed this

Twelfth Day of November, 1996

Attest:

BRUCE LEHMAN

*Attesting Officer*

*Commissioner of Patents and Trademarks*